United States Patent

[11] 3,632,252

| [72] | Inventors | Stephen W. Amberg<br>St. James;<br>Thomas E. Doherty, Setauket; Jacob J.<br>Fikert, Huntington, all of N.Y. |
|---|---|---|
| [21] | Appl. No. | 804,467 |
| [22] | Filed | Mar. 5, 1969 |
| [45] | Patented | Jan. 4, 1972 |
| [73] | Assignee | Owens-Illinois, Inc. |

[54] APPARATUS FOR FORMING ARTICLES
16 Claims, 11 Drawing Figs.

[52] U.S. Cl. .................................... 425/168,
156/224, 264/92, 425/385, 425/388
[51] Int. Cl. ...................................... B29c 17/04
[50] Field of Search ........................... 18/19 H, 19
R, 9, 10, 21, 20 C, 35, 38, 6 E, 2 F, 1 N, 17 H, 1
DM, 5.5, 5 A, 4 B, 5 R, 19 M, DIG. 60; 152/224,
502

[56] References Cited
UNITED STATES PATENTS

| 2,425,043 | 8/1947 | Moore | 156/224 X |
|---|---|---|---|
| 2,548,303 | 4/1951 | Gova | 18/21 X |
| 2,896,387 | 7/1959 | Brock | 18/4 B UX |
| 2,923,195 | 2/1960 | Reibel et al. | 156/502 X |
| 3,027,596 | 3/1962 | Knowles | 18/21 X |
| 3,072,961 | 1/1963 | Gilbert | 18/10 |
| 3,181,202 | 5/1965 | Martelli et al. | 18/21 X |
| 3,324,508 | 6/1967 | Dickinson | 18/19 H |
| 3,479,694 | 11/1969 | Winstead | 18/19 R |
| 3,512,332 | 5/1970 | Klein | 156/224 X |

*Primary Examiner*—Robert L. Spicer, Jr.
*Attorney*—Leonard W. Suroff

ABSTRACT: The present invention relates to a method and apparatus for forming articles from a web of single-ply or laminate plastic material that may have information thereon, and which information is to be in register with the article formed.

FIG. 4

PATENTED JAN 4 1972 3,632,252

INVENTORS
STEPHEN W. AMBERG
THOMAS E. DOHERTY
JACOB J. FIKERT

BY Leonard W. Suoff
ATTORNEY

INVENTORS
STEPHEN W. AMBERG
THOMAS E. DOHERTY
JACOB J. FIKERT

BY Leonard W. Auroff
ATTORNEY

APPARATUS FOR FORMING ARTICLES

BACKGROUND OF THE INVENTION

1. Field of The Invention

The invention deals broadly with the method and apparatus for forming articles from a web of plastic material and particularly continuously forming from a printed web articles such as lids, such that the printed information contained thereon is in register with the formed article, with the web being of a single-ply or laminate structure.

2. Discussion Of The Prior Art

A. Printed Plastic Web Material

In general, thermoforming of articles from plastic sheet material either on a continuous basis, such as found in a rotary former, hereafter discussed, as well as on a intermittent or cyclical basis, hereafter discussed, is known in the art and generally includes certain thermoforming principals. Although several variations of the thermoforming concept have been developed for both continuous and intermittent operations there has remained certain problems with respect to the thermoforming of plastic sheet material having disposed thereon printed information in an oriented pattern which is to be contained on the article formed in registration therewith and with a minimum of distortion.

The prior art dealing with continuous thermoforming operations by using a rotary drum former has not appreciated a primary objective set forth and solved by the present invention, as to continuously forming articles from a printed web of plastic material so as to obtain a minimal amount of distortion of the printed information on the formed article, as the web is brought to its thermoforming or plastic softening point temperature and then brought back to its normal room temperature without visibly distorting the printed information contained thereon.

U.S. Pat. No. 3,071,812 discloses a continuous rotary molding machine for the manufacture of lids and other articles, but is deficient in that it does not make provision for the inherent problems associated with thermoforming of plastic printed sheet material.

U.S. Pat. No. 3,026,566 deals with a rotary machine for the automatic vacuum forming of continuous thermoplastic bands, and employs mechanical means for effecting the airtight seal between band and drum prior to applying vacuum thereto, and further does not address itself to the problem inherent with alignment of a printed sheet and the drift of the printed information in rotary forming.

U.S. Pat. No. 3,181,202 deals with a rotary machine for the combined automatic vacuum and pressure forming of continuous thermoplastic bands and besides not being related to preprinted items it discloses the use of an exteriorally disposed mechanical sealing member in conjunction with the rotatable drum which complicates the mechanical structure of the equipment.

With respect to intermittent thermoforming operations, there are a number of prior patents illustrating various forming techniques, as for example illustrated in U.S. Pat. Nos. 3,172,159 and 3,342,914. Intermittent thermoforming apparatus is presently utilized for manufacturing lids and other articles.

Certain present equipment is employed for forming lids and other articles from a sheet of plastic material that has printed indicia information thereon, and this is generally accomplished by bringing the web of plastic material into overlapping relationship with the plurality of die cavities and by vacuum securing the sheet to a plate positioned in spaced relationship to the die cavities. The plastic sheet of material is held in fixed relation to the plate, as by vacuum, and the sheet is heated throughout as to both the area to be thermoformed which includes the printing, as well as the area between the respective printed portions that are not to be thermoformed. By providing a plurality of vacuum ports the sheet is held in place and thereafter transferred into contacting relationship with the die cavities and formed by vacuum into a plurality of lids. Although this process is presently utilized, it has the inherent disadvantage that it is a process adaptable for use on an intermittent thermoforming system rather than a continuous system.

B. Thermoforming Laminate Plastic Sheet

The assignee of the present invention has been commercially producing for several years a Dub'l Seal package which is disclosed and covered by U.S. Pat. No. 3,301,464, which issued on Jan. 31, 1967, and is entitled CONTAINER AND LID. The package includes a receptacle and a lid formed from an inner closure which is made of a laminate material and an outer closure removably secured thereto such that when the lid is applied to the receptacle the inner closure is heat sealed thereto such that when the outer closure is removed the inner closure protects the contents of the receptacle and is subsequently removed by the user from its sealing engagement with the receptacle. The present manufacturing techniques are such that the disk forming the inner closure is first cut from a sheet of coated material and thereafter placed separately in the outer closure that has been previously formed. Although this assembly procedure has produced a commercially practical package, it is obvious that a less complicated and more economical process is obtained if the inner and outer closures are simultaneously formed without the necessary step of individually assembling the inner and outer closure together.

The problem of thermoforming plastic sheet material of laminate structure is an important consideration of the present invention. The individual assembling of the inner and outer closure has a disadvantage, namely that there are certain pleates or wrinkles on the inner closure and a smooth surface is not obtained. These wrinkles are eliminated by the ability to simultaneously thermoform the inner and outer closure together into the desired lid configuration.

In U.S. Pat. No. 3,226,458 although it touches upon the forming of laminate material, there is no appreciation of maintaining a temperature gradient or differential between the respective layers forming the laminate structure.

OBJECTS OF THE INVENTION

A primary object of the present invention is to provide a method and apparatus for continuously forming articles from a web of plastic sheet material.

Another object of the present invention is to provide a method and apparatus for continuously forming articles in which controlled flow of the formed portion is obtained by maintaining a temperature differential between the to be formed portion and the remaining web.

Another object of the present invention is to provide a method and apparatus for continuously forming articles from a web having printed information thereon, which information is to be in registration with the formed articles having a minimum of distortion.

Another object of the present invention is to provide a method and apparatus for forming articles on either an intermittent or continuous basis from a web of plastic laminate structure, which articles may or may not contain printed information thereon.

Another object of the present invention is to provide a method and apparatus for rapidly forming a plurality of shaped articles from an endless web of thermoplastic material wherein the web is of a laminate structure having generally different softening point temperatures.

Other objects of the present invention will be obvious as the disclosure proceeds.

SUMMARY OF THE INVENTION

The present invention includes a series of steps working together in interrelated combination to produce the end result of the present invention such that articles, for example lids, can be continuously formed from a web or sheet of plastic material, which generally has printed information in registration with the formed article. In accordance with the invention a previously printed web of plastic material is progressively advanced onto rotating drum means for supporting the advancing web and having a plurality of cavities in spaced apart relationship to each other on the surface of the drum. The drum is preferably multisided with each side having a face extending transversely to the direction of drum rotation, with one or more cavities in spaced apart relation to each other on each side thereof. The web is continuously fed or advanced into overlapping relation and engagement with continuously rotating drum means, and positioning means is utilized for maintaining the sheet in relatively fixed relation to the drum so that the orientation of the printing is in registration with the cavities on the drum. The rotation of the sheet and drum is maintained in essentially fixed relation to each other by providing spaced apart apertures on each side of the web which engage the positioning means in the form of pins extending on each face of the drum, which mate with and extend through the apertures on the web to maintain it in fixed relation with respect to the rotating drum. As the web and drum are continuously rotated they are moved relative to stationary heating means causing the web to be heated to an elevated temperature, such as to reach the thermoforming temperature of the plastic material.

Since the web is received in overlapping relationship to the drum, and the web is initially at substantially room temperature, the respective surfaces of the drum and web, may or may not be initially in intimate contacting relationship due to the surface configuration of the drum or the stiffness of the web. If the drum is circular it will be in contact, if it is multisided having flat faces it may not be in immediate complete contact until partially elevated to its thermoforming temperature, at which time it intimately comes into contact with the respective faces of the drum. At this time when there is intimate contact with the web of plastic material and at its thermoforming temperature it is ready to be formed such as to obtain a plurality of articles therefrom. When the web reaches its thermoforming temperature clamping means is utilized for holding the web against the faces of the drum such that each of the die cavities is substantially sealed off from the drum surface, and by providing a differential pressure, such as by vacuum, the drawing of the plastic sheet material against the cavities in conforming relationship to form the articles is obtained. Subsequent to the formation of the articles the sheet of material is stripped from the rotating drum and thereafter the individual articles are cut from the web by blanking means.

To maintain a controlled temperature of the drum, which is substantially below the thermoforming temperature of the plastic sheet, temperature control or cooling means is provided such that a temperature gradient or differential temperature can be maintained between drum and web. This temperature differential plays an important role in the invention since it substantially confines the respective rates of cooling of those portions of the web to be formed in overlapping relationship to the cavities as compared to those portions of the web not to be formed in contact with the drum faces between the respective cavities, so that the amount of distortion of the printing is maintained at a minimum.

In accordance with the theory of the present invention, since the printed information is generally contained on the upper surface of the web and the mere clamping by vacuum from within the drum merely retains only the generally nonprinted surface of the sheet in fixed relation to the drum, the opposite side of the web, containing the printed indicia information is free to move laterally unless it is substantially confined by some means so that the amount of material drawn into the die cavity is controlled, which simultaneously controls the degree of printing distortion. Applicants have found that by heating the entire advancing sheet of plastic material and simultaneously, or subsequently, peripherally first cooling those portions of the heated sheet of plastic material between the respective cavities, or those not being formed, it is possible, in a sense, to annularly confine the flow of the heated plastic web by establishing and maintaining a temperature differential or gradient. Since as the sheet is in contact with the drum it is continuously cooled at a greater rate between the cavity portions, by the continuously cooled drum, an annular cooled band surrounds each die cavity and limits the formed area to substantially a disc portion containing the indicia information. Then when the vacuum is applied only the material in overlapping relationship to each die cavity is substantially brought into intimate engagement therewith, permitting controlled and regulated flow of the web and in turn the printed information is maintained in registration with the formed article having a minimum of distortion. This is even the case when the printed information on the article is of enlarged size relative to the printed information as it appears on the web.

In accordance with another aspect of the present invention laminate sheets of plastic material are thermoformed into articles ideally suited for use as containers or Dub'l Seal lids in accordance with U.S. Pat. No. 3,301,464, assigned to the present assignee. The laminate web of material is formed from an outer layer of polystyrene or other material and an inner layer which in and of itself may be formed of several layers, but particularly all or a layer of the inner sheet, which is in contact with the supporting surface, has a melting or softening point temperature less than that of the outer layer so that the temperature gradient must be properly controlled across the thickness of the web in order to form the laminate web into an article which is adapted for use in which the inner layer of the formed article is heat sealed to the upper portion of a receptacle and removable from the outer layer which together forms a lid for a container.

Essentially for laminate webs the same steps are carried out if the outer layer has preprinted information thereon, except that the temperature differential between the respective sides or surfaces of the sheet are maintained by the supporting surface which may be in the form of a rotating drum, acting as a heat sink for cooling the inner layer of the material.

BRIEF DESCRIPTION OF THE DRAWING

For better understanding of the present invention, reference should be had to the accompanying drawings, wherein like numerals of reference indicate similar parts throughout the several views and wherein.

PREFERRED EMBODIMENTS

Before discussing the present method and apparatus, it will be observed that only semidiagrammatic views of the overall equipment have been shown in the drawings to highlight the features which are characteristic of the present invention. It will be understood that conventional means may be employed to rotate the drum, establish the necessary differential pressure, heat the plastic web, and blank the articles form the web subsequent to them being thermoformed, etc. The molding machine and its operation will be best understood by reference to the diagrammatic view which illustrates the main components of the machine and the manner in which they operate to form the articles.

Figure 1:
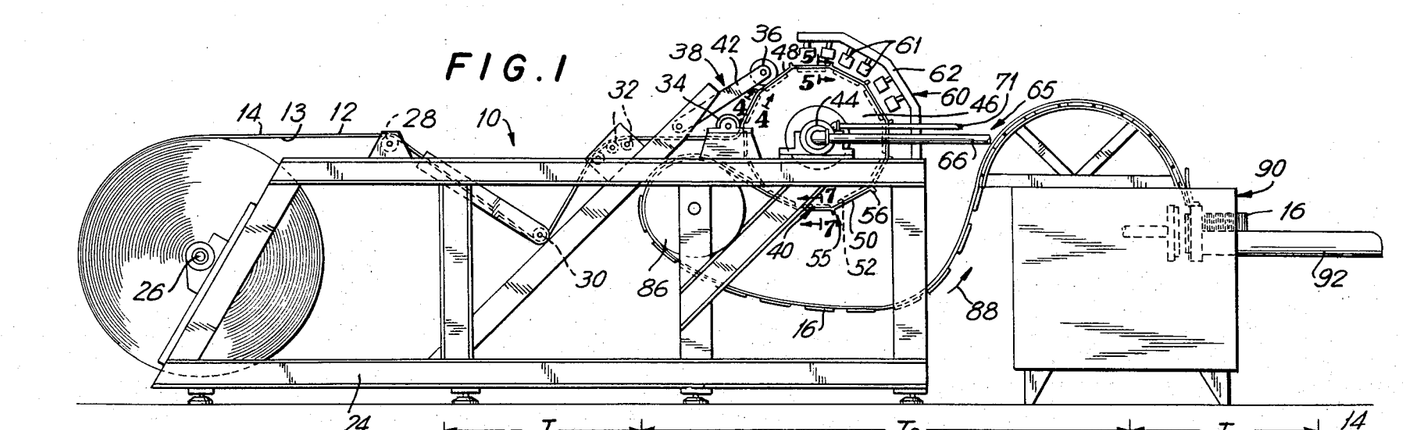
FIG. 1 is a diagrammatic view of a molding machine having incorporated therein the principle features of the present invention.

Referring now in greater detail to the drawings, and in particular to the form of the invention in FIG. 1, there is disclosed a novel method and apparatus for forming relatively shallow thin-walled articles from a web or sheet of plastic material. The machine which is illustrated in FIG. 1, indicated by the reference 10, is adapted to form or mold from a continuously traveling web 12 of a suitable thermoplastic sheet forming material, having a lower surface 13 and upper surface 14, which latter surface may contain printed indicia means 15 (see FIG. 6) thereon in a generally set or oriented pattern, a plurality of relatively thin walled articles 16, as seen in FIG. 2, which are particularly adapted for use as lids or covers on cups or containers made of paper, plastic, glass or other materials.

Figures 2, 3:
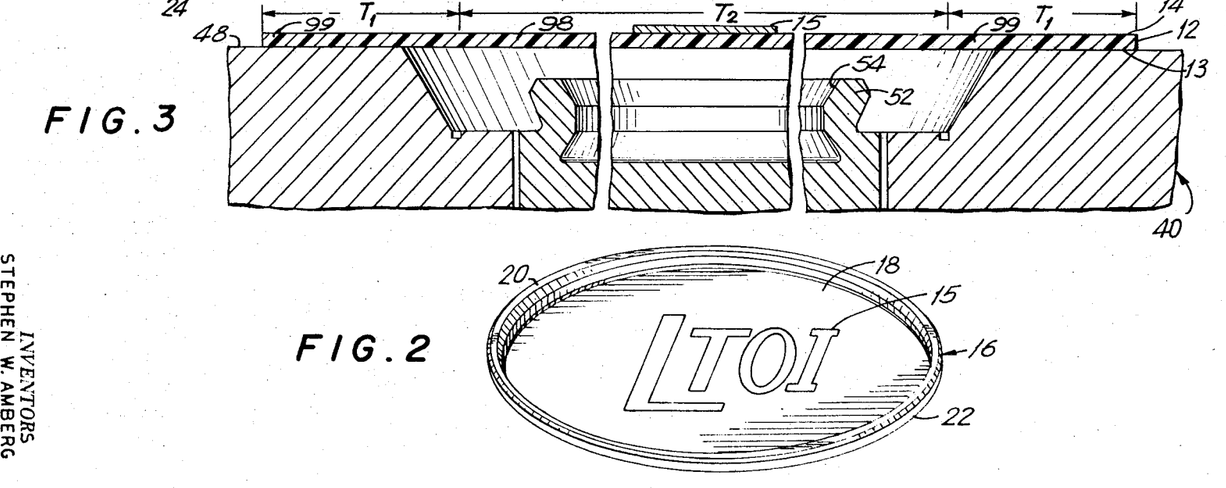
FIG. 2 is a perspective view of an article which is adapted to be formed on the machine.
FIG. 3 is a partially schematic view to help illustrate the principle of the present invention.

The lids 16 as seen in FIG. 2, is performed in successive stages as illustrated in FIGS. 4–8, and hereafter discussed in detail, which may generally comprise a top wall forming disc 18, a relatively narrow flangelike tubular wall section 20 with its upper edge reversely bent to provide a downwardly and outwardly extending lip 22, which remains with the lid when the latter is separated from the web 12. The lids 16 are formed on the traveling web 12 and are separated from the latter after they are formed by diecutting around the outside of the rim or lip 14 by blanking means. The machine 10, as illustrated in FIG. 1, is designed to form the lids in successive rows of generally two or more extending across the width of the web 12, with the lids 16 in each row being shaped simultaneously on the machine.

The operative elements of the machine 10 are mounted on an upright frame structure 24 and included at one end is a support shaft 26 on which the web 12 of previously printed roll stock of plastic sheet material is supported. The web 12 may be supplied directly from a printer so that it need not be stored but continuously printed and fed into the forming machine 10 which is capable of operating at high speeds. The web 12 is advanced by combination guide roll 28, dancer roll 30, support rolls 32 and feed rolls 34 and 36, each mounted transversely of the roll of web material and secured in a conventional manner to the frame structure 24.

Pressure means 38 may be provided to assure an initial engagement between the web 12 and retaining means 55, as by mounting two feed rolls 36 at each end of the rotating mans 55 as by pivotally mounted arms 42 extending from the frame structure 24. The pressure means 38 may be spring mounted or the weight of the roller 36 is sufficient to apply the necessary static force to assure engagement with the retaining means 55.

By using advancing means the web 12 is brought into position with the molding drum means 40 which is rotatably mounted on a shaft 44 and connected to drive means (not shown) for rotating same. The drum means 40 includes a supporting drum member 46 having an exterior peripheral surface 48 which may be annular or having a plurality of sides or faces 50, with each side having one or more article forming or molding die cavity assembles 52, which are arranged in peripheral axial alignment on the drum member 46 and each of which is adapted to include one or more molding dies 54 (See FIG. 4). The molding drum 46 could be circular, but as illustrated is multisided and includes 12 separate faces or sides 50 displaced equidistantly around the outer periphery 48 of the molding drum 46 such that it is divided into equal separate sections. Drive means is employed for rotating the drum means 40 and web 12 through the various rollers such that the web 12 is brought into overlapping relationship with the drum member 46 such that the means for feeding the web 12 onto the drum member 46 occurs simultaneously with the retaining means 55 engaging the web 12 for maintaining it in alignment with the drum so as to maintain the oriented printed indicia means 15 on the sheet of plastic material in predisposed alignment or registration with each molding die cavity 54.

The retaining means 55 may include a plurality of outwardly extending pins 56, one or more extending from each side 50 of the drum member 46 and preferably one on each side of the web 12 such that they mate with complimentary apertures 58 previously provided through the web 12 in conjunction with the printed information placed thereon so that the initial alignment is obtained to avoid gross lateral movement between the web 12 and the drum means 40. When the web initially contacts the drum member 46 if it is multisided it does not necessarily immediately fully contact the exterior peripheral surface 48, but it is in overlapping relation to it as seen in FIG. 1, when the web is heated it thereafter becomes softened such that it fully contacts the face 50 of the drum member 46 to which it is held in alignment by the locating pins 56.

Heating means 60 is provided to raise the temperature of the web 12 to generally its thermoforming temperature, and might include a plurality of individual heaters 61 mounted by bracket 62 to the frame structure 24. The type and number of heaters 61 will in part depend upon the number of sides 50 of the drum member 46, and the speed of rotation of the drum member 46, the heaters may extend a circumferential length greater than one side 50 to permit sufficient time to elevate the web 12 from its generally room temperature. At its thermoformed temperature, depending upon the plastic which will vary, as for example if the sheet is of polystyrene material and of a thickness in the range of 0.005 to 0.040 it will generally be in the temperature range from 200° F. to 400° F. Once the sheet is heated then its rigidity is removed and is brought into intimate contact with the rotating drum means 40.

Figure 4:
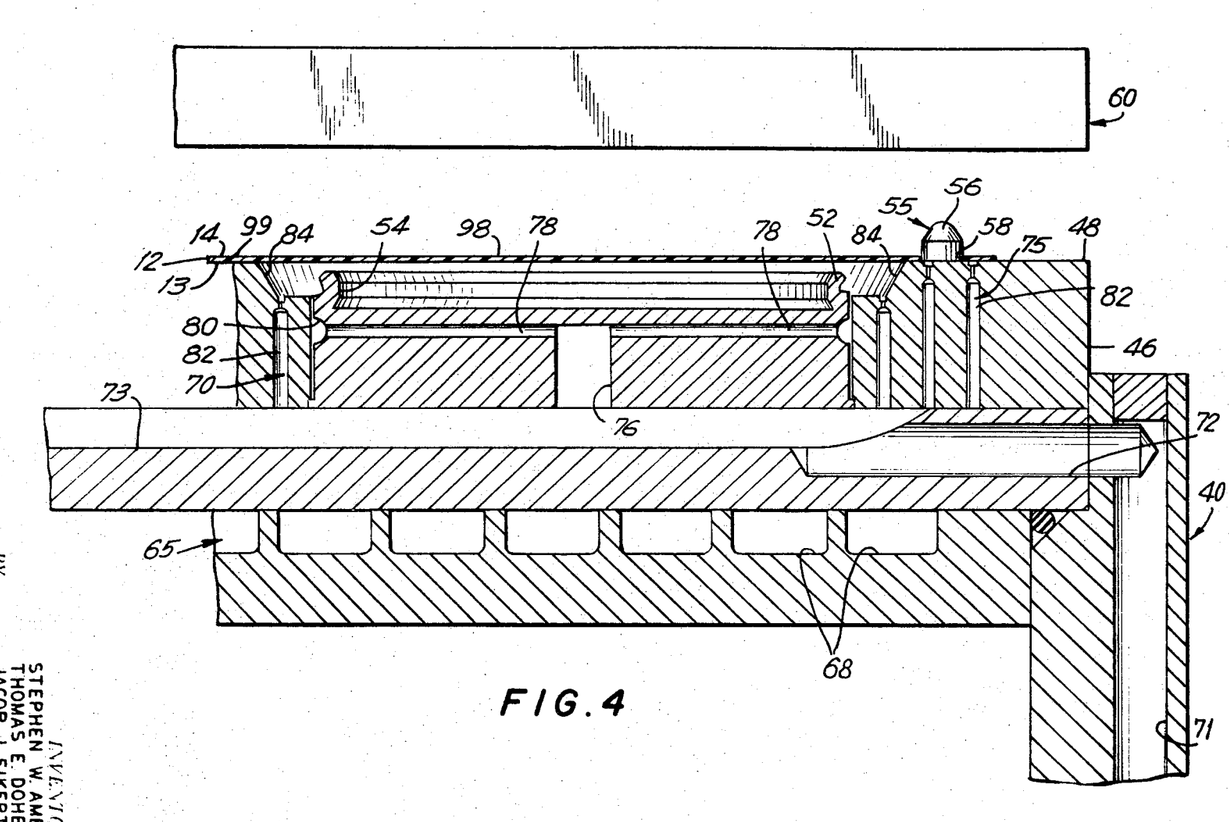
FIG. 4 is a fragmentary sectional view to an enlarged scale showing a portion of the cavity assembly, the molding drum and vacuum ports taken on the line 4—4 of FIG. 1.

Cooling means 65 as seen in FIG. 4, is provided in operative relation with the rotating drum means 40 such that the drum is maintained at a temperature substantially below the thermoforming temperature of the web 12. Briefly, by maintaining the drum at substantially room temperature, but preferably in the range of 60°–150° F. it is possible to begin the cooling of the web 12 of plastic material initially between the respective cavity assemblies 52 prior to the complete heating of the web 12 and the forming operation, which initial cooling tends to control the flow of plastic material into each die cavity 54 such that a minimum of distortion of the lettering 15 on the upper surface 14 of the web 12 is obtained. The cooling means 65 includes a conduit 66 coupled to a fluid supply (not shown) such as water, with interconnecting annular passage means 68 contained within the rotating drum as particularly seen in FIG. 4, which passage means 68 are connected to the water supply conduit 66 that enters into the rotating drum and by the series of passages 68 extending circumferentially around the drum they act as a water jacket sufficient to cool the die cavities 54 and the portions of the drum extending therebetween as it is continuously rotating.

The structure of the drum member 46 is such as to include a plurality of individual cavity assemblies 52 extending below the exterior surface 48 of the drum means 40 and being of a shape conforming to the article formed.

Forming means 70 is provided for obtaining a differential pressure on the web 12 when in operative relation with the drum means 40, which may be by vacuum to form the web 12. Prior to or simultaneously with forming means 70 being activated, sealing means 75 may be employed to substantially seal off each die cavity and prevent lateral movement of the surface 13 of the web 12. Accordingly each respective cavity assembly 52 may be individually sealed off such that a plurality of sections of the web 12 are brought into contacting engagement against the face of the drum with each isolated section.

Accordingly the differential pressure for purposes of discussion may be essentially divided into the exterior clamping means 75 and interior forming means 70. The exterior clamping mans 75 is utilized after the heated web 12 is brought into substantially sealing engagement with the drum surface 48 so as to individually seal off each die cavity assembly 52. Simultaneously therewith or subsequent thereto the forming means 70 is utilized and which by vacuum maintains a differential pressure such that the web 12 extending above each die cavity 54 is brought into engagement by the vacuum thermoforming process therewith.

To obtain the differential pressure each die cavity assembly 52 includes vacuum ports extending therein such that when the vacuum is applied to the web 12 in its selected portions it is brought into forming relationship with the die cavity. The differential pressure as seen in FIG. 4 is applied for forming through a main conduit 71 that extends from an exterior source to a connecting passage 72 which is associated with a feed passage 73. The feed passage 73 connects to a cavity passage 76 which in turn branches horizontally to branch passages 78 which terminate at a groove 80 on the die cavity 54 to apply a suction through the spacing formed between the die assembly 52 and drum member 46. A series of outwardly extending passages 82 extend between the feed passage 73 to the exterior 48 of the respective faces of the drum member 46, and the undercut portion 84 of the drum. The vacuum passages for the clamping means 75 to the exterior of the die cavity may be separate and disconnected from the vacuum passage means for the forming such that each may be controlled individually since it might be preferable that the vacuum to the exterior to the die be first applied to initially bring the web 12 into peripheral contact around the die assembly 54 such as to first seal off each cavity and then apply suction directly through each die cavity to form the article 16.

Subsequent to the formation of the lids 16 the formed web 12 extends over a take off roller 86 which is maintained transversely to the direction of the travel of the web 12 as indicated by arrow 88 and the formed web continues to blanking means 90 for severing the formed article 16 from the web 12 of plastic material as by a blanking operation such that the drum continuously moves away from the machine and is accumulated as the blanking machine operates, which may be of an intermittent or continuous type, with the lids 16 thereafter stacked in a row as on a support member 92 and accumulated till they are transported into a sleeve or carton for storage. The blanking means 90 may be coupled to the support structure 24 or may be positioned on a separate piece of equipment as illustrated.

To facilitate an understanding in the manner in which the present method and apparatus is employed for forming the articles 16 reference is made to FIGS. 4 through 8, as it essentially relates to a preprinted web 12 of plastic material of either single-ply or laminate structure. The respective Figures hereafter discussed in detail illustrate the position of the web 12 at various locations during rotation with the drum means 40 as it is brought from room temperature to its elevated temperature and cooled back to substantially room temperature with a minimum of distortion of the printed information.

The description contained herein and particularly the drawings are set forth for the purpose of illustration and not for the purpose of limitation. With particular reference to FIG. 3, in the practice of the present invention, designated surface portions of a web 12 of plastic material is regulated temperaturewise to control the temperature in selected portions thereof, the portions 99 not to be formed are designated by the temperature $T_1$ and the other portions 98 of the web which are being thermoformed are designated by the temperature $T_2$. By maintaining of this temperature differential between $T_2$ and $T_1$ its possible to accurately control the extent of both the distortion of the printing 15 on the upper surface 14 of the web 12 as it is brought into conforming relationship with the cavity assembly 52 of the rotating means 40, and the draw or flow distribution of the formed web as it conforms to the shape of the die cavity 54. If the proper control is not exercised, plastic articles such as lids and containers may be produced which are deficient in having distortion of the printing 15 thereon and unequal wall thickness. There are various ways in which temperature control of a plastic web of material may be effected to carry out the present invention, one of which is illustrated herein by cooling the rotating drum means 40 to obtain the temperature control zone $T_1$ and $T_2$.

FIG. 3 helps illustrate the theory and concepts of the present invention in that the printed information 15 contained on the portion 99 designated temperature zone $T_1$ is not permitted to expand while the to be formed portion 98 designated by the temperature zone $T_2$ is permitted to expand. The surface 13 is held in place as the vacuum is applied thereto while the surface 14 on which the printed indicia 15 is contained is free to move laterally unless it is substantially confined by some means so that the amount of material brought into the die cavity is controlled, which simultaneously controls the degree of printing distortion. It has been found by maintaining the temperature differential with the temperature $T_2$ in the portion 98 being greater than the temperature $T_1$ in the portion 99 lateral restraint is provided so as to produce a confined area defined substantially by the portion 98 with a temperature differential with its surrounding area 99 to obtain the controlled flow of the web 12 in the confined area 98.

Treating of the web 12 to obtain the temperature differential is related to the type of web being treated, type of inks used for printing, the depth of draw of the article to be formed, the speed of rotation of the web 12, the surface configuration of the rotating drum means 40, and other related factors. To obtain the temperature differential it has been found that it is possible to heat to a thermoforming temperature the to be formed portions 98 forming the confined areas, and maintaining the remaining portions 99 of the web 12 at a temperature below that of the to be formed portions 98 to maintain the temperature differential between the respective portions. This way we in a sense annually confine or restrict the flow of the heated plastic web by establishing and maintaining the temperature differential or gradient. The web is maintained at the temperature $T_1$ by being in contact with the drum surface 48 so that it is continuously cooled at a greater rate between the cavity portions resulting in an annularly cooled band surrounding each mold assembly 52 to form a disc portion 98 containing the indicia information 15. Then by drawing the heated portion 98 by vacuum into each mold cavity controlled and regulated flow of the portion 98 is obtained and the printed information 15 is maintained in registration with the formed article having a minimum of distortion. This distortion is kept at a minimum even though the printed information on the article is generally of an enlarged size relative to the printed information as it appears on the web 12.

Accordingly, the treating of the web to obtain the temperature differential between the to be formed portions 98 in substantially overlapping relationship to the die cavities and their remaining portions 99 may be obtained by selectively cooling the respective portions of the web as it is advanced over and around the drum means 40. One method of treating the web to obtain the temperature differential is heating to a thermoformed temperature the to be formed portions 98 and at the same maintaining the remaining portions 99 at a temperature below that of the to be formed portions 98 so as to maintain the temperature differential. The temperature difference between $T_1$ and $T_2$ should be of a degree to obtain the confined area of portions 98 such that the flow is substantially limited thereto. In most instances this requirement will result in the temperature $T_1$ being below the thermoforming temperature of the web 12 while the portion 98 being at a temperature $T_2$ that might be at or above the thermoforming temperature. It is also possible that both temperatures $T_1$ and $T_2$, be below the softening or thermoforming temperature of the material but that the temperature differential be sufficient to obtain the desired result of confining the flow of plastic by nonmechanical means.

FIG. 4 as briefly described above illustrates the web 12 being maintained in place by the retaining means 55 to prevent lateral movement with the drum means 40 and simultaneously having the web 12 heated to a softening point temperature by the heating means 60 as seen positioned in FIG. 1. As the drum means continues to rotate the web is continuously passed beneath the heaters 61 until they have reached the desired temperature range in the to be formed portion 98 which is in overlapping relationship to the cavity assembly 52. The not to be formed portion 99 remains in contact with the drum surface 48 which by the cooling means maintains the surface 48 in a preselected temperature range.

Figure 5:
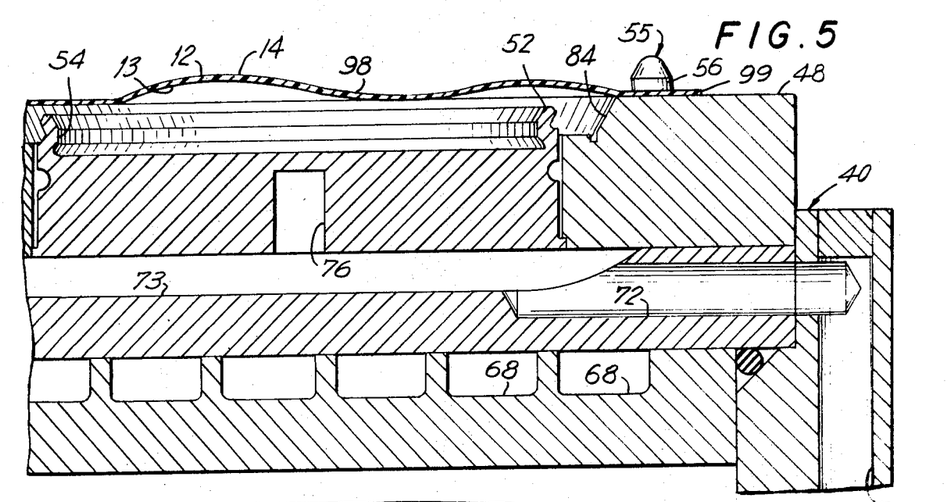
FIG. 5 is a fragmentary sectional view to an enlarged scale showing the web being processed through the rotary forming equipment and at an elevated temperature, taken on the line 5—5 of FIG. 1.
Figure 6:
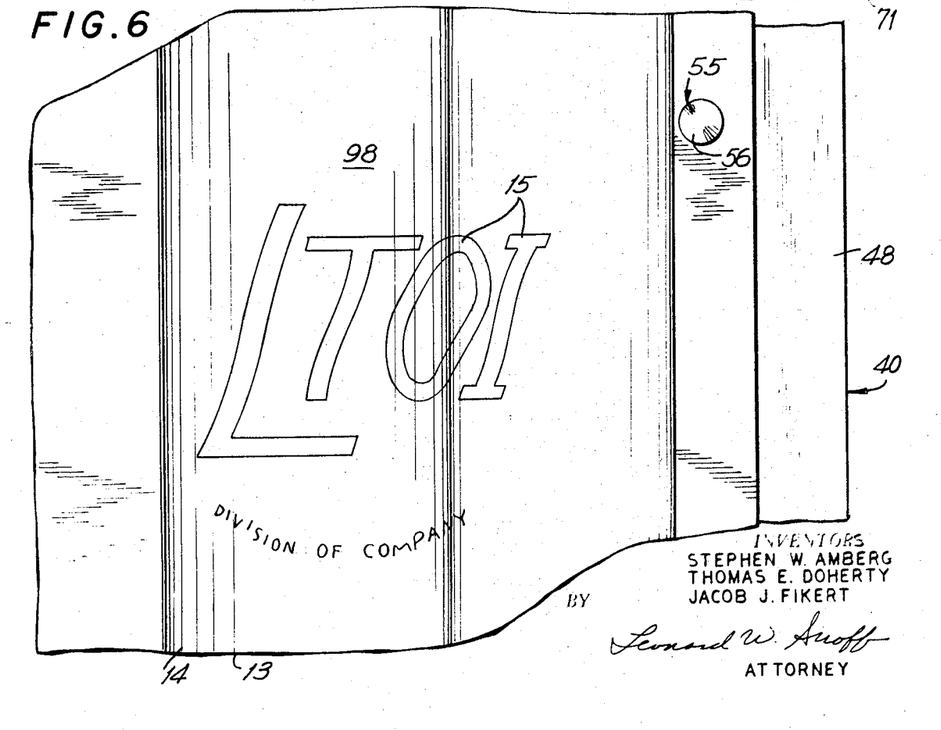
FIG. 6 is a top plan view of the apparatus illustrated in FIG. 5 showing the printed information on the web.

FIGS. 5 and 6 illustrate the reaction of the web 12 to it being heated so that we see the formed portion 98 expanding such that in a sense it buckles while simultaneously being annularly confined by the relatively cool portions 99 so as to confine the expansion of the heated portion affecting the printed information 15 contained on the upper surface 14 of the web 13 so as to obtain a minimal distortion thereon. This minimal distortion at its elevated temperature is relieved as the process is continued through the forming operation.

Figure 7:
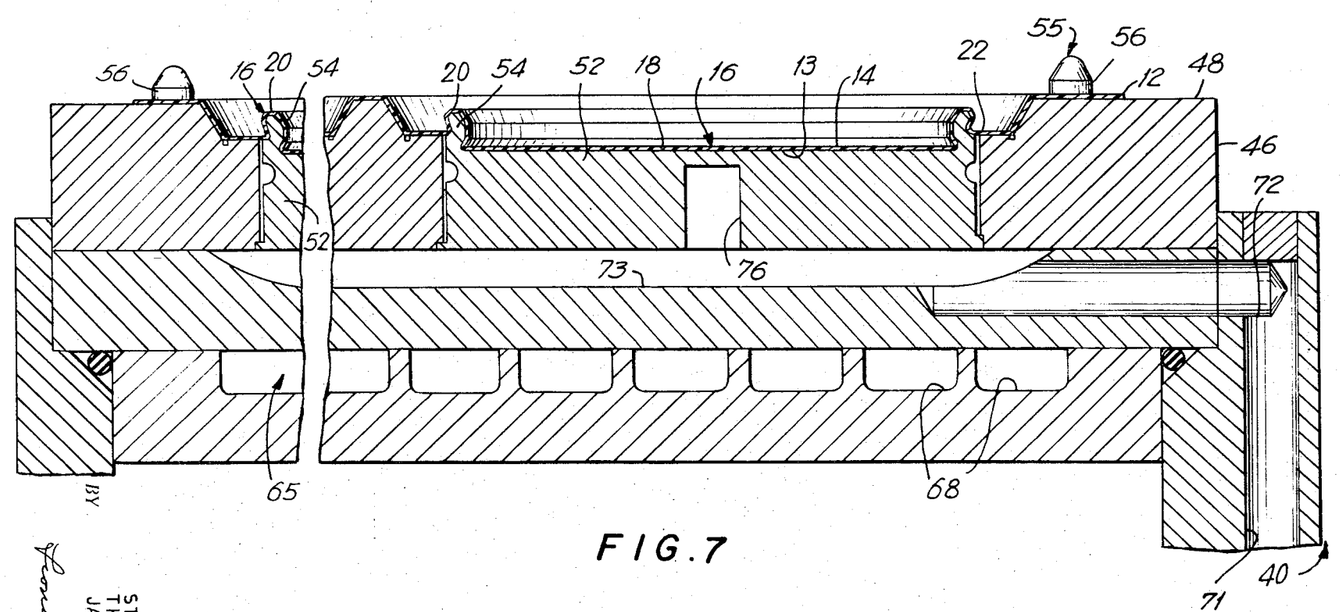
FIG. 7 is a fragmentary sectional view of an enlarged scale showing a portion of the cavity assembly, and the molding drum, with the article having been formed on the drum member, taken on the line 7—7 of FIG. 1.
Figure 8:
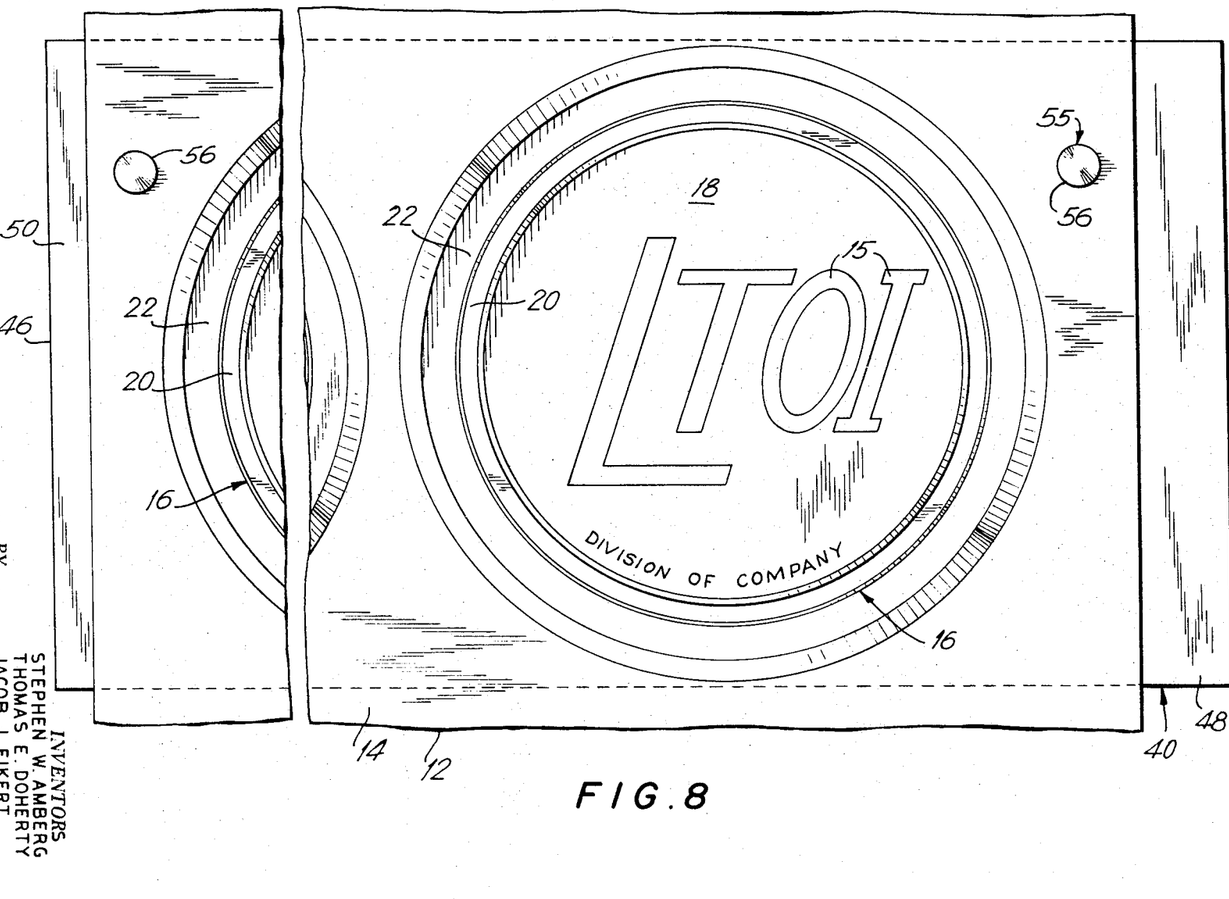
FIG. 8 is a top plan view of the apparatus illustrated in FIG. 7 showing the printed information thereon being formed with minimum distortion.

FIGS. 7 and 8 illustrate the formed article 16 after drawing of the web against the cavity assemblies 52 to form the articles 16 and at the same time maintaining the articles 16 within the cavities for a sufficient period of time to permit a cooling of the formed portions os that the entire web may be stripped from the rotating drum means 42 after the entire web 12 is cooled to below its thermoforming temperature prior to removing it from contact with the drum means 40. In the actual forming process we have a clamping of the web 12 against the face 48 of the drum means 40 such that each of the cavities is substantially sealed off from the drum surface and as explained above this accomplished by clamping means 75 by applying a vacuum force through the drum to the surface 13 of the web 12 so as to bring the web 12 into intimate contact with the surface 48 of the drum.

The present invention is also adapted to be used for forming articles from a web of laminate plastic material that are ideally suited for use as Dub'l Seal lids in accordance with U.S. Pat. No. 3,301,464, and in general adapted for use with containers for comestibles in which it is desired that the inner layer in contact with the comestible have certain qualities for maintaining the comestibles therein and the exterior layer have other qualities which may be adapted for printing or other uses.

The laminate material may be formed on a supporting surface which may be the exterior surface 48 of rotating drum means 40 or that of an intermittent forming equipment, except that the temperature differential of the present invention is utilized in either type of operation.

Figure 9:
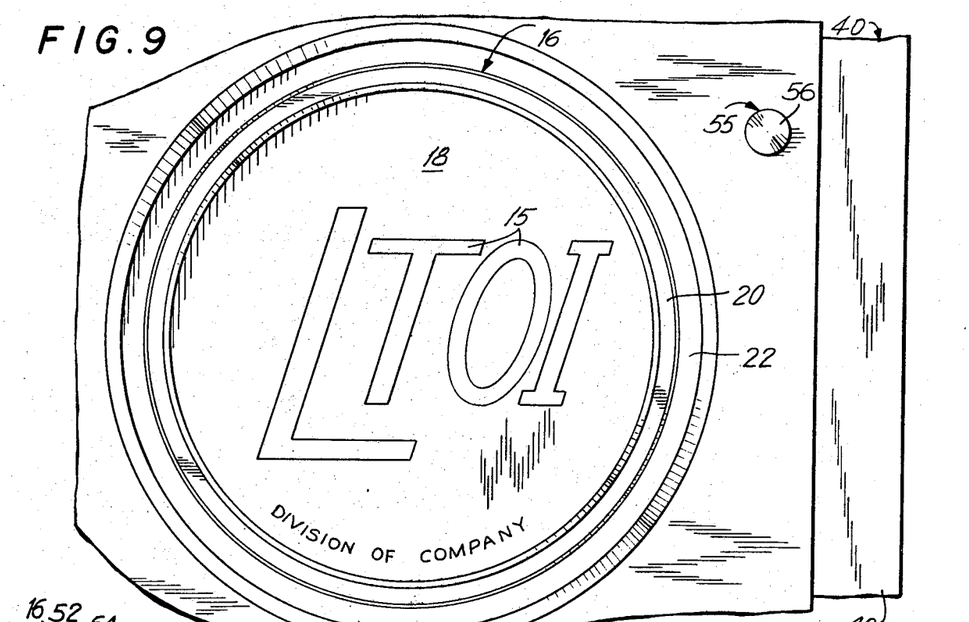
FIG. 9 is a fragmentary top plan view showing the formed article with the web being of a laminate structure.
Figure 10:
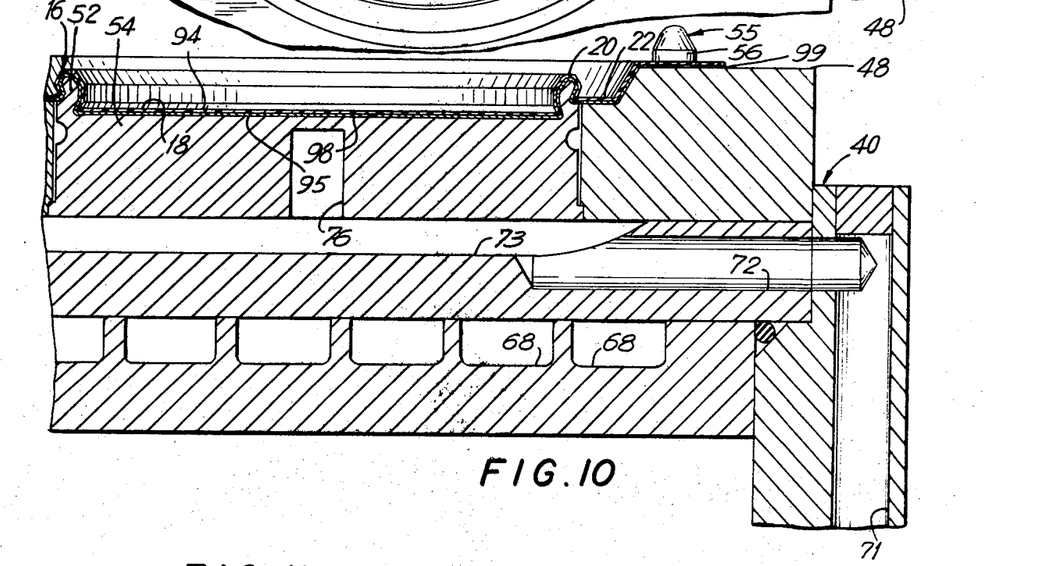
FIG. 10 is a fragmentary sectional view of the apparatus illustrated in FIG. 9 showing the laminate material being formed in accordance with the present invention.

Illustrated in FIGS. 9 and 10 is an articles 16 formed form a web 12 of laminate plastic material which is formed by positioning the web 12 on a supporting surface 48 having a plurality of cavity assemblies 52 in spaced-apart relationship to each other. The plastic laminate material is generally composed of an outer layer 94 and inner layer 95, each having a predetermined softening point temperature with the inner layer in contact with the supporting surface 48 having generally a lower softening point temperature than the outer layer 94.

The web 12 may or may not have printed information 15, thereon, and if the web does have printed information thereon then essentially a first temperature differential and a second differential is formed. The first temperature differential extends between the respective inner and outer layer 95 and 94, in the areas be formed into articles so that each layer is substantially maintained at its respective softening point temperature. The second temperature differential is maintained between the to be formed portion 98, which are in substantially overlapping relationship to the respective die cavities 52 and the remaining portions 99 of the web, whereby substantial uniform displacements of the printed information 15 on the laminate web 12 is obtained during thermoforming to obtain minimum distortion on the formed article 16. The articles being formed by drawing the web 12 on to the supporting surface of the die cavity 52 to form the articles.

Figure 11:
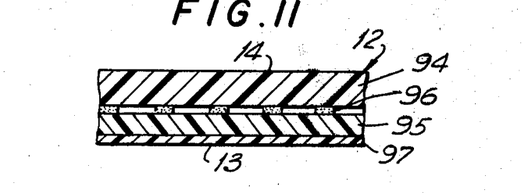
FIG. 11 is an enlarged fragmentary section of one form of laminate material in accordance with the invention.

Various laminate structures may be utilized in accordance with the present invention and particular reference may be had to FIG. 11 which illustrates one form of laminate structure that might be utilized for forming Dub'l Seal lids in accordance with the above-referenced patent. The web 12 may comprise an outer layer 94 formed from polystyrene which may have a softening point temperature in the range of 200° F. to 400° F. and may have a thickness of 0.010 to 0.020 inch. The inner layer 95 may have a thickness in the range of 0.001 to 0.005 inch and be of polyethylene or polypropylene material. The respective inner layer 95 and outer layer 94 may be removably secured together by a mounting adhesive in the form of dots or ribs 96 that might be made from polyvinyl ethyl ether and cover approximately 50 percent of the surface area between the layers. To permit the securement of the formed article to another receptacle or object the inner surface 13 has a heat sealing adhesive containing 97 thereon which may be of minimal thickness adapted to seal both to a wax or plastic container. The coating 97 may be selected for the desired application and the softening point temperature of the outer layer 95 may be greater than that of the inner layer 94. The adhesive coating 97 must be maintained at a temperature during the forming operation or immediately thereafter to obtain a setting of it so that it does not adhere to the supporting surface and is useable thereafter. By being able to provide cooling means in the drum means 40 then the setting of the adhesive coating is obtained so that subsequent to the forming operation an article is formed having the desired characteristics.

The laminate structure may be composed of an inner layer 95 and outer layer 94 that are extruded together and not adapted to be separated from each other or having different thermoforming temperatures. Accordingly, the outer layer 94 may be made from polystyrene, ABS or polypropylene while the inner layer 95 which may be selected for its chemical resistance of the comestibles may be selected from the group including polyolefin, ionomer, polyethylene film, polypropylene film, vinyls and ABS.

Accordingly for laminate materials it is possible to form some into articles whether or not the rotating drum is used except that the temperature differential should be maintained between the respective portions if printed information is contained thereon and to obtain controlled flow of the formed material for proper distribution in the resultant article.

It is obvious that many variations may be made in the apparatus and processes set forth above without departing from the spirit and scope of this invention.

We claim:

1. A machine for continuously forming articles from a web of plastic sheet material which has printed information on the upper surface thereof, said machine comprising, A. a rotatably mounted drum, B. a plurality of die cavities around the peripheral supporting surface of said drum in spaced-apart relationship to each other, C. means for feeding the web of plastic material onto the periphery of said drum, D. positioning means for maintaining said sheet in relatively fixed relationship to said drum simultaneously with or prior to forming said articles to maintain the printed information in predisposed relationship to said die cavities.

E. means for treating said web to obtain a temperature differential between the printed portions of said web in overlapping relation to said cavities, which printed portions are at the thermoforming temperature, and the other portions therebetween; which other portions are at a temperature below that of the printed portions, wherein by maintaining said temperature differential the printed information on said article has a minimum of distortion, and F. means for internally applying a vacuum through the periphery of said drum bringing said web into conforming relationship thereto form printed articles.

2. Apparatus as defined in claim 1, wherein said means for treating said web includes heating means mounted relative to said drum for elevating the temperature of said web to its thermoforming temperature, and means for cooling said drum surface such that it is maintained below the thermoforming temperature of said web.

3. Apparatus as defined in claim 2, wherein said means for cooling said drum surface includes a plurality of radially extending spaced-apart passages below said surface for receiving a fluid therein.

4. Apparatus as defined in claim 1, and further including clamping means for substantially sealing a plurality of sections of said web against the face of said drum with each section being in substantially surrounding relationship to each respective die cavity.

5. Apparatus as defined in claim 1, and further including blanking means in operative relationship to said rotatably mounted drum to continuously separate the formed articles from said web.

6. Apparatus as defined in claim 58, wherein said positioning means includes a plurality of pins secured to and extending outwardly from said drum adapted to be positioned within apertures provided in said web.

7. Apparatus as defined in claim 6, and further including pressure applying means mounted in operative relation to said rotatably mounted drum so as to initially bring said web into contacting relation with said positioning means.

8. A machine for forming articles from a printed web of plastic material, comprising
   A. a rotatably mounted drum having a plurality of die cavities around the peripheral supporting surface thereof in spaced-apart relationship to each other,
   B. means for feeding the web of plastic material onto the periphery of said drum, and
   C. positioning means for maintaining said sheet in alignment with said drum so as to maintain any oriented printed information on said web in predisposed relationship to said die cavities, said positioning means including a plurality of pins secured to and extending outwardly from said drum adapted to be positioned within apertures provided in said web,
   D. means for treating said web to obtain a temperature differential between the portions of said web in overlapping relation to said cavities which are at the thermoforming temperature of said web, and the portions substantially therebetween, which are at a temperature below that of said to be formed portions, wherein the printed information contained on the formed article has a minimum of distortion, said means including heating means mounted relative to said drum for elevating the temperature of said web to its thermoforming temperature and means for cooling said drum surface between said die cavities to maintain the portions of said web surrounding said cavities at the temperature below that of the to be formed portions,
   E. means for internally applying a vacuum through the periphery of said drum bringing said web into conforming relationship thereto to form said articles,
   F. clamping means for substantially sealing a plurality of sections of said web against the face of said drum with each section being in substantially surrounding relationship to each respective die cavity, and
   G. blanking means in operative relationship to said rotatably mounted drum to continuously separate the formed articles from said web.

9. Apparatus as defined in claim 8, wherein said means for cooling said drum surface includes a plurality of radially extending spaced-apart passages below said surface for receiving a fluid therein.

10. A machine for forming articles from a web of laminate plastic material composed of an inner layer and an outer layer having different softening point temperatures comprising,
    A. a supporting surface having a cavity,
    B. means for advancing said web onto the supporting surface to overlie the cavity,
    C. means for treating said web to obtain a temperature differential between said respective layers substantially in the area to be formed in overlapping relation to said cavity, wherein said outer layer and inner layer are each substantially maintained at their respective softening point temperatures during the forming of said articles, said means for treating said web comprising
       i. means for heating the entire web so that the outer layer reaches its softening temperature, and
       ii. means for substantially simultaneously therewith cooling said supporting surface to cool said inner layer to maintain it at a temperature which is not substantially higher than its softening point temperature, and
    D. means for bringing said web against said cavity to form said article.

11. A machine as defined in claim 10, wherein said supporting surface forms the periphery of a rotating drum and said articles are continuously formed thereon.

12. A machine for forming an article from a web of plastic sheet material which comprises a first portion and a second portion surrounding the first portion, said machine comprising.
    A. a supporting surface having a cavity,
    B. means for advancing said web onto the supporting surface so that the first portion overlies the cavity and so that the surrounding portion is in contact with the supporting surface
    C. means for treating said web to obtain a temperature differential between said first portion and the surrounding portion, wherein said first portion is substantially at its softening point temperature during the forming of an article therefrom and wherein said surrounding portion is at a temperature below the softening temperature, to minimize distortion of the first portion, said means for treating said web comprising,
       i. means for heating the entire web so that the first portion overlying the cavity is heated substantially to its softening point temperature, and
       ii. means for substantially simultaneously therewith cooling said supporting surface to maintain the surrounding portion of the plastic web, which is in contact with said supporting surface, from being heated by said heating means to as high a temperature as said first portion, and
    D. means for bringing said heated first portion of the web into contact with said cavity to form said article.

13. Apparatus according to claim 12 wherein said first portion comprises printing, and wherein said temperature differential is effective to minimize distortion of said printing during the forming of said article.

14. A machine for forming articles from a printed web of laminate material composed of an inner layer and an outer layer having different predetermined softening point temperatures, comprising
    A. a rotatably mounted drum having a plurality of die cavities around the peripheral supporting surface thereof in spaced apart relationship to each other,
    B. means for feeding the web of plastic material into the periphery of said drum,
    C. positioning means for maintaining said sheet in alignment with said drum so as to maintain the printed information on said web in predisposed relationship to said die cavities,
    D. means for treating said web to obtain
       1. a first temperature differential between the respective inner and outer layers in the areas to be formed into articles so that each layer is substantially maintained at its respective softening point temperature, and 2. a second temperature differential between the to be formed portions substantially in overlapping relationship to said cavities and the remaining portions of said web, whereby substantially uniform displacement of the printed information on said web is obtained during forming to obtain minimum distortion on the formed article,
D. means for internally applying a vacuum through the periphery of said drum bringing said web into conforming relationship thereto to form said articles, and
E. blanking means in operative relationship to said rotatably mounted drum to continuously separate the formed articles from said web.

15. A machine as defined in claim 14, wherein said means for treating said web includes heating means mounted relative to said drum for elevating the temperature of said web to its thermoforming temperature.

16. A machine as defined in claim 15, wherein said means for treating said web to obtain said temperature differential further includes means for cooling said drum surface such that it is maintained below the thermoforming temperature of said web.

* * * * *